Aug. 1, 1967  J. P. ERCEG ETAL  3,334,169

METHOD OF THERMOFORMING FOAMED SHEETS

Filed May 27, 1964

3,334,169
METHOD OF THERMOFORMING
FOAMED SHEETS
Jack P. Erceg, Belleville, and Frederick H. Collins, Cedar Grove, N.J., assignors, by mesne assignments, to W. R. Grace & Co., New York, N.Y., a corporation of Connecticut
Filed May 27, 1964, Ser. No. 370,715
2 Claims. (Cl. 264—321)

This invention relates to methods of forming articles from thermoplastic foam sheets, such as polystyrene foam sheets, and, more specifically, relates to methods for improving the transfer of heat from the external surfaces of said sheets to the interior portions thereof.

Thermoplastic foam sheets are utilized in the manufacture of numerous articles, for example, drinking cups. Cups made from such thermoplastic foam sheets are particularly desirable because of their thermal insulating properties, making them eminently useful for excessively hot or cold drinks.

However, the property of thermal insulation of thermoplastic foam sheet also causes extreme difficulties in adequately heating said sheets prior to forming them into the desired article. Heat applied to the external surfaces of said sheets has difficulty traveling to the internal portions thereof and, as a consequence, said internal portions are not heated sufficiently to permit forming of the sheet in deep draws without rupturing or otherwise distorting the sheet. Efforts to increase the heat transfer into the interior of the sheet by increasing the temperature applied to the external surfaces thereof have met with failure due to overheating and resultant deterioration, de-orientation and cellular collapse of the outer surfaces.

It is, therefore, a principal object of this invention to provide a method for increasing the rate of heat transfer from the external surfaces of thermoplastic foam sheets to the interior thereof.

Another object is the provision of improved methods for producing articles from foamed thermoplastic sheets.

Further objects and advantages will be apparent from the following detailed description and drawings in which.

Figure 1:
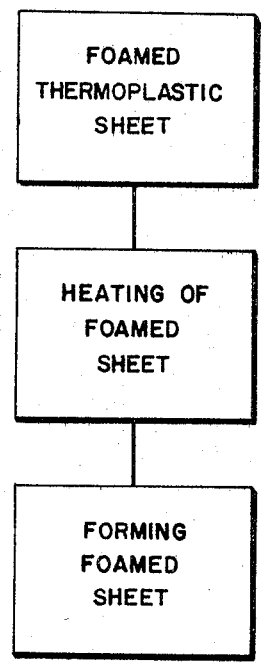
FIG. 1 shows a block diagram of the prior art thermoforming process.
Figure 2:
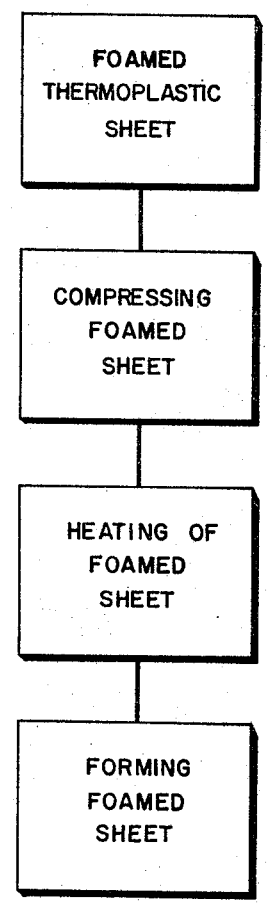
FIG. 2 shows a block diagram of the thermoforming process including the improvement of the present invention.

This invention is based on the discovery that a thermoplastic foam sheet calendered to a higher density, e.g., in the range of 10 to 25 pounds per cubic foot, accepts heat applied to the external surfaces thereof and transfers said heat internally much more readily than the same sheet that has been produced with a lower density, e.g., 7 pounds per cubic foot or less. The present invention is also predicated upon the finding that the calendered higher density foam, e.g., 10 to 25 pounds per cubic foot, will expand to about 90 percent the expansion of a low density foam, e.g., one having a density of 3 to 8 pounds per cubic foot, having the same weight per unit of area. The invention is still further based on the discovery that low density foam sheets will undergo cellular collapse, de-orientation, ultimately resulting in rupturing of the foam sheet much more quickly under the same conditions of heating, than foam sheets which are calendered to a higher density.

Overheating of polystyrene foam sheets first causes the cells thereof to collapse as visually indicated by the development of an increased shininess in the surface. The cells are thought to rupture and flatten out resulting in de-orientation and thinning out and shrinking of the sheet. The thinning out and shrinkage continue progressively until the sheet ruptures. Shrinkage continues to quickly enlarge the rupture or hole until the sheet is rendered substantially useless except as scrap.

The novel method of the present invention comprises the step of compressing a thermoplastic foam sheet, such as polystyrene foam, from a low density, e.g., 3 to 8 pounds per cubic foot, to a higher density, e.g., 10 to 25 pounds per cubic foot, thereafter heating the densified sheet, preferably but not necessarily, from both surfaces while said sheet is gripped along both edges to prevent shrinkage thereof, and thereafter forming the heated sheet by any conventional forming method, such as, vacuum-forming, pressure-forming or matched mold-forming techniques, or by combinations of any two or more of such techniques. The heating step is conducted so as to raise the temperature of the sheet to at least that temperature at which the sheet is pliable and formable but to a temperature below the point at which said sheet undergoes cellular collapse and/or de-orientation of the nature explained hereinbefore. Suitable temperatures at which the sheet can be heated lie in the range of 180° F. to 250° F.

Comparative studies have been made wherein thermoplastic sheets having the same weight per unit area but having different densities, e.g., 7 pounds per cubic foot as opposed to 12 pounds per cubic foot, were placed in an oven. It was found that the lower density foam showed a collapsed, ruptured surface more than 20 percent faster than the higher density sheet, thus establishing that the heat acceptability of the higher density sheet was 20 percent greater than that of the lower density sheet.

The present invention is primarily based on the important discovery that equivalent results are not obtained by employing a polystyrene foam sheet which has been produced directly with a density of 10 to 25 pounds per cubic foot and that it is critical to compress a low density foam. A foam sheet that is produced directly with a higher density in the range of say 10 to 25 pounds per cubic foot is very brittle even at forming temperatures and is not at all suitable for forming into articles, especially deep-drawn articles, such as drinking cups. On the other hand, a low density foam sheet, e.g., 3 to 8 pounds per cubic foot, that has been compressed in accordance with this invention to a higher density, e.g., 10 to 25 pounds per cubic foot, is quite flexible, pliable and generally formable at forming temperatures and is eminently suited for drawing articles especially deep-drawn articles, e.g., drinking cups.

It has been found, furthermore, that a low density foam sheet compressed to a higher density foam sheet according to this invention will resume up to 90 percent or more of its original volume during heating in the forming operation, thus reverting almost to its original low density and desirable properties of greater heat insulating capability, and lower weight and cost per unit. On the other hand, foam sheet made directly with a high density, e.g., 10 to 25 pounds per cubic foot, does not expand to any appreciable extent during later forming operations and will not improve its heat insulating capability or lower the weight or cost per article.

Figure 3:
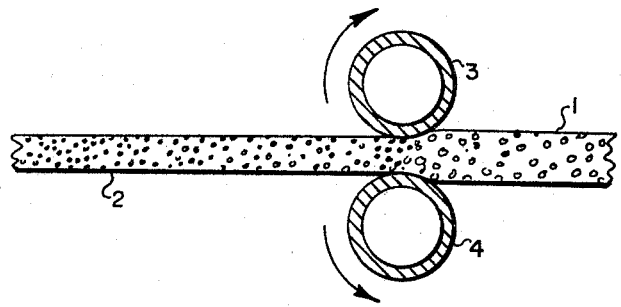
FIG. 3 shows one means for compressing the foam sheet according to the present invention.

The compressing step of the present invention can be carried out in any suitable manner, for example, by passing the foam sheet into the nip of calender rolls provided with a nip opening sufficient to give the desired reduction in density. FIG. 3 shows a foam sheet 1 entering the nip of calender rolls 3 and 4 and leaving the rolls as compressed sheet 2.

The heating and forming steps are well-known. There are machines available for continuously forming thermoplastic foam sheets as there are machines available for intermittently forming thermoplastic sheets into useful articles. In such machines the heating of the thermoplastic foam sheet is preferably, but not necessarily, performed on both surfaces of the sheet. The present invention or improvement comprising the step of compressing the thermoplastic foam sheet prior to heating and forming in the conventional manner to improve the heat conductivity of the sheet and its ability to uniformly heat throughout prior to forming into an article is applicable to any known methods or apparatus for heating and forming such sheets into articles. One such method and apparatus is disclosed in copending U.S. patent application, Ser. No. 145,541, for Forming Machine and Process, filed Oct. 13, 1961, now U.S. Patent No. 3,189,399 issued June 15, 1965, to William A. Jacobs et al.

By way of example, a polystyrene foam sheet having a density of 7 pounds per cubic foot and a thickness of about 0.210 inch was passed through a pair of calender rolls having a nip opening of 0.060 inch. The compressed sheet at this point had a density of about 21 pounds per cubic foot and a thickness of about .070 inch. It was then heated to a surface temperature of about 240° F. and formed in cooled matched dies into insulated drinking cups having a density of about 6 pounds per cubic foot and a wall thickness of about 0.065.

It is to be understood that the above description is by way of example only and that details for carrying the invention into effect may be varied without departing from the scope of the invention.

What is claimed is:
1. In the method of thermoforming articles from a thermoplastic foam sheet whereby said sheet is heated and then formed into said articles, that improvement comprising, compressing said foam sheet to an increased density prior to said heating step.
2. The improvement claimed in claim 1 wherein said sheet is polystyrene foam and it is compressed from a density of about 3 to about 8 pounds per cubic foot to a density of about 10 to about 25 pounds per cubic foot.

References Cited

UNITED STATES PATENTS

| | | | |
|---|---|---|---|
| 2,744,291 | 5/1956 | Stastny et al. | 264—53 |
| 2,860,378 | 11/1958 | Urchick | 264—45 |
| 2,942,301 | 6/1960 | Price et al. | 264—292 |
| 3,039,911 | 6/1962 | Fox | 264—321 XR |
| 3,082,483 | 3/1963 | Bickford | 264—321 |
| 3,137,747 | 6/1964 | Kline | 264—321 XR |
| 3,170,974 | 2/1965 | Jacobs | 264—321 XR |

OTHER REFERENCES

Collins, F. H.: "Controlled Density Polystyrene Foam Extrusion," in SPE Journal, July 1960, pages 705–790.

Modern Plastics, "New Techniques for Processing Expandable Styrene Foam," September 1960, pages 113, 114, 193 and 196.

ALEXANDER H. BRODMERKEL, Primary Examiner.

P. E. ANDERSON, Assistant Examiner.